United States Patent [19]

Haduch et al.

[11] Patent Number: 4,530,568

[45] Date of Patent: Jul. 23, 1985

[54] FLEXIBLE OPTICAL INSPECTION SYSTEM

[75] Inventors: Paul R. Haduch, West Milford; Anthony Rega, Ridgefield, both of N.J.

[73] Assignee: American Hospital Supply Corporation, Evanston, Ill.

[21] Appl. No.: 442,882

[22] Filed: Nov. 19, 1982

[51] Int. Cl.³ .............................. G02B 5/17
[52] U.S. Cl. .................... 350/96.26; 128/6; 128/397; 350/96.10
[58] Field of Search ............... 350/96.10, 96.24, 96.25, 350/96.26; 128/634, 396, 397, 398, 4, 6; 250/227; 356/241

[56] References Cited

U.S. PATENT DOCUMENTS

| 2,975,785 | 3/1961 | Sheldon | 128/398 X |
| 3,071,161 | 1/1963 | Ulrich | 350/96.26 X |
| 3,190,286 | 6/1965 | Stokes | 350/96.26 X |
| 3,270,641 | 9/1966 | Gosselin | 128/4 X |
| 3,557,780 | 1/1971 | Sato | 128/4 |
| 4,042,823 | 8/1977 | Decker et al. | 250/227 |
| 4,298,312 | 11/1981 | MacKenzie et al. | 350/96.26 X |

*Primary Examiner*—John Lee
*Attorney, Agent, or Firm*—Perman & Green

[57] ABSTRACT

An inspection instrument is fabricated with segments of limited controllable flexure disposed between an objective segment and a control head. The segments are provided with interior frame members to maintain a generally rigid configuration, the variation in flexure providing a stair-climbing-like capability which is advantageous for clearing obstructions in the area being examined. Articulation in two dimensions is provided within each of the segments. Control lines thread through the instrument to contact frame members at distal ends of each of the segments to effect independent pivoting among the segments. The proximal ends of the control lines connect with manipulative members in the control head for manual control of the articulation.

10 Claims, 16 Drawing Figures

FLEXIBLE OPTICAL INSPECTION SYSTEM

BACKGROUND OF THE INVENTION

This invention relates to a flexible inspection system for use in both industrial and medical applications and, more particularly, to an elongated, flexible, fiber-scopic inspection device having internal vertebrae for independent support and articulation.

Elongated tubular inspection devices, particularly such devices incorporating flexible fiber-optics, are often used to inspect sites which would not normally be visible to the human eye. The jet engine is one type of mechanical structure for which such inspection would be most useful, particularly to inspect the 1st stage, or high temperature stage, of the engine just behind the burner can which has components that are most subject to wear and deterioration. The arrangement of the jet engine's rotor and stator blades, particularly those in the high temperature stage of the engine, presents a most complex geometry which has not been amenable to inspection in the past other than by first disassembling the engine. There has been a need for some form of inspection device which can be placed near the rotor and stator blades, and other important sites within the engine, for the inspection thereof without the laborious task of disabling the engine. The use of this type of instrument would effect a substantial savings in the cost of maintenance of the engines. Savings would result from the man-hours saved by avoiding the disassembly and reassembly of the engine. Additional savings would result from the increase in service time of the engine since the downtime for maintenance would be substantially reduced.

A further appreciation of such tubular inspection devices can be more readily attained by considering those currently in use in the practice of medicine. For instance, a common form of such a device, known as an endoscope, is used for inspection of the human colon while a similarly structured device is used for inspection of the urethra. The endoscope is conventionally used in the diagnosis of tumors and other conditions in the lower gastrointestinal tract. The endoscopic examination involves the physician observing the intestinal wall through an eyepiece in the control head of the instrument. Generally, the endoscope is provided with a source of illumination at its objective end, the end which is placed adjacent the area to be examined, and a bundle of light-transmitting fibers through which an image of the examined area is transmitted back to the eyepiece. The endoscope can further incorporate a channel which provides a washing fluid for application to the site under examination as well as a surgical tip and other features.

A factor to be considered in the construction of the endoscope for its normal medical use is its flexibility and articulation which permits the objective tip to be directed along the channel of the colon. An endoscope can be made to traverse a considerable distance within the colon providing that any bends in the colon have sufficiently large radius of curvature to enable the objective end of the endoscope to be readily articulated to follow the course of the colon. Care must be taken, however, to precisely guide the instrument so as not to puncture the colon wall, especially as the device is being inserted.

A problem arises in using presently available flexible devices for the internal inspection of complex articles of manufacture such as interior regions within jet engines. For example, certain compartments within the engine, such as the aforementioned regions within the turbine, are at present effectively inaccessible to viewing by an inspector. Such inaccessibility is the case even with the use of an inspection device such as an endoscope because the articulation of the inspection device requires some sort of guiding surface, such as the interior wall of the colon, to orient and support the inspection device. A jet engine has an interior characterized by relatively open spaces and few appropriate supporting surfaces readily available to guide the objective end of the inspection device. In addition, presently known endoscope designs, even when used for their originally intended purpose, are not easily able to negotiate all colon configurations without substantial risk of puncturing the colon wall.

SUMMARY OF THE INVENTION

The foregoing problems are overcome and other advantages are provided by an inspection device which is constructed in a generally elongated tubular format within a flexible outer jacket which is readily articulated. The inspection device includes an optical system for the transmission of illuminating light and the viewing of reflected light, and, also, if desired, other features such as an interior conduit which may be utilized for the conducting of a washing fluid to a site under examination.

In accordance with one embodiment of the invention, the inspection device comprises a series of segments including an objective segment at the distal end whereby subject matter is observed and a control head at the proximal end including knob means whereby the inspection device is manually manipulated for guidance of the objective segment to a desired location. The inspection device further comprises a flexible segment connected to the control head and incorporating an inner support such as of counter-spiraling coil springs, a transitional segment connected to the distal end of the flexible section, and a deflector segment connected between the transitional segment and the objective segment.

The transitional segment, in one embodiment, incorporates internal structure in the form of vertebrae means which may be manually oriented by remote control to accomplish a predetermined amount of articulation. The deflector segment is structured to have increased lateral movement relative to the transitional segment. The articulation of both sections is variable under control of the user of the instrument by means of internal control cables or lines which thread through the device to reach the distal ends of the transitional and deflector segments. The flexible section does not have sufficient rigidity to be free-standing and, accordingly, some sort of guiding and support structure such as a tubular conduit is used for it. The transitional segment is sufficiently stiff to permit a free-standing orientation and provides a base upon which the deflector segment can be articulated even though the flexible section of the system needs to be supported and guided. The objective segment of the instrument can be redirected or reoriented by the deflector segment so as to be freely guided around interposed barriers since the transitional segment maintains a relatively stiff orientation from which the deflector can be oriented.

A major feature of one embodiment of the invention is a climbing capability of the free-standing distal end whereby the objective segment can be elevated, lowered or moved laterally in a cantilevered fashion through regions of a complex structure such as a jet engine. This is possible even though there is no support or guiding structure for the direction of the objective segment toward the inspection site other than adjacent portions of the mechanism being inspected. The climbing capability is accomplished by the difference in stiffness and articulation of the transitional segment and the deflector segment and their positions relative to one another. Thus, by manipulation of the control lines by knob means at the control head, the transitional segment and the deflector segment can be bent and laterally deflected independently of each other to provide for a motion somewhat analogous to be useful as a stair-climbing-like activity. Thereby, after the transitional and deflector segments have advanced past the conduit that guides the flexible segment, the cantilevered distal end is able to climb around obstructions under the direction of the operator to bring the objective segment to the inspection site. The instrument incorporating the invention can also be readily utilized in the exploration of cavities having a sharp bend around which conventional endoscopes cannot be passed without a manipulation of the human body to distend or otherwise reshape the sharp curve of the cavity.

BRIEF DESCRIPTION OF THE DRAWINGS

The foregoing aspects and other features of the invention are explained in the following description, taken in connection with the accompanying drawings wherein.

DETAILED DESCRIPTION OF THE INVENTION

Figure 1:
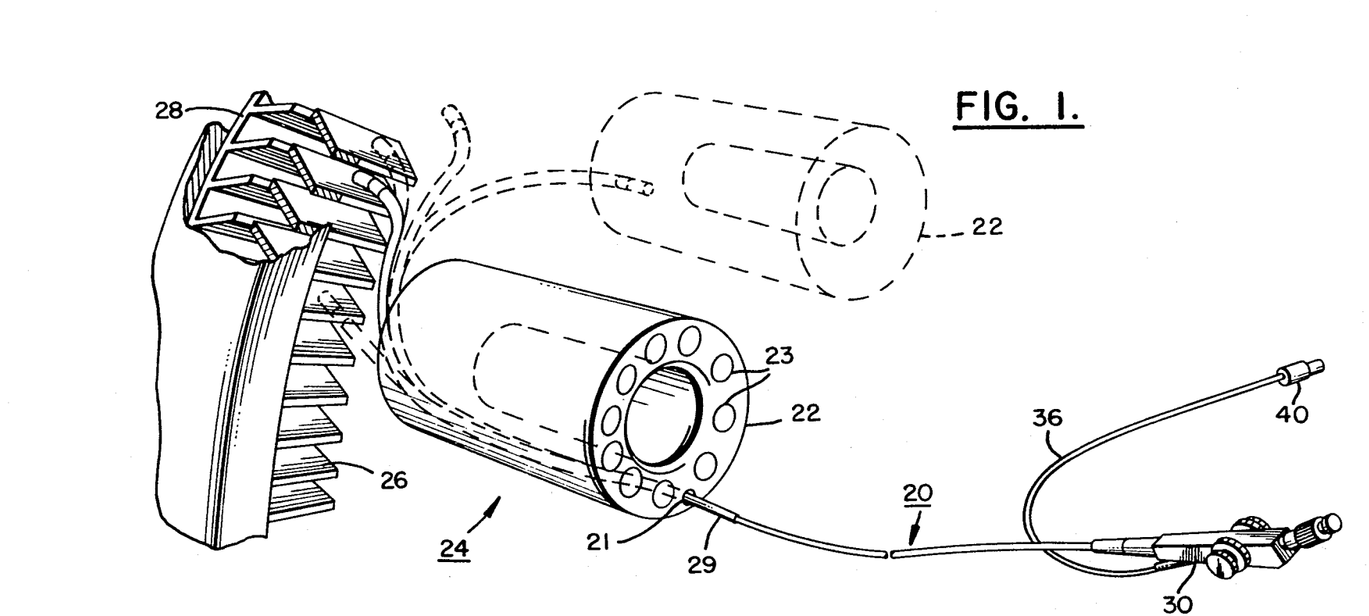
FIG. 1 is a stylized view of an inspection instrument incorporating the invention for viewing the interior region of a jet engine.
Figure 2:
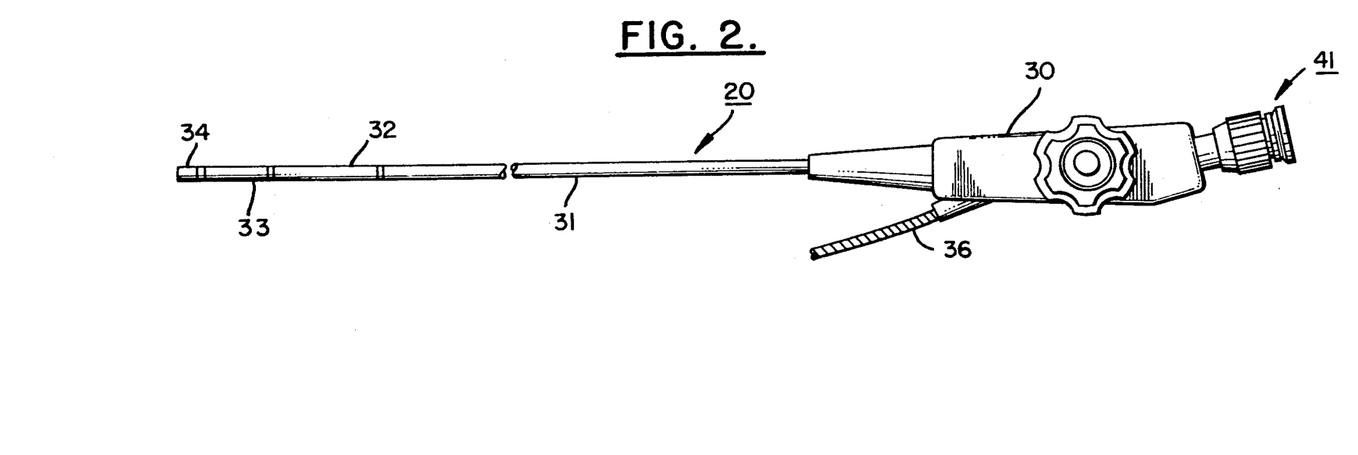
FIG. 2 is a plan view of the instrument of FIG. 1.
Figures 3, 4:
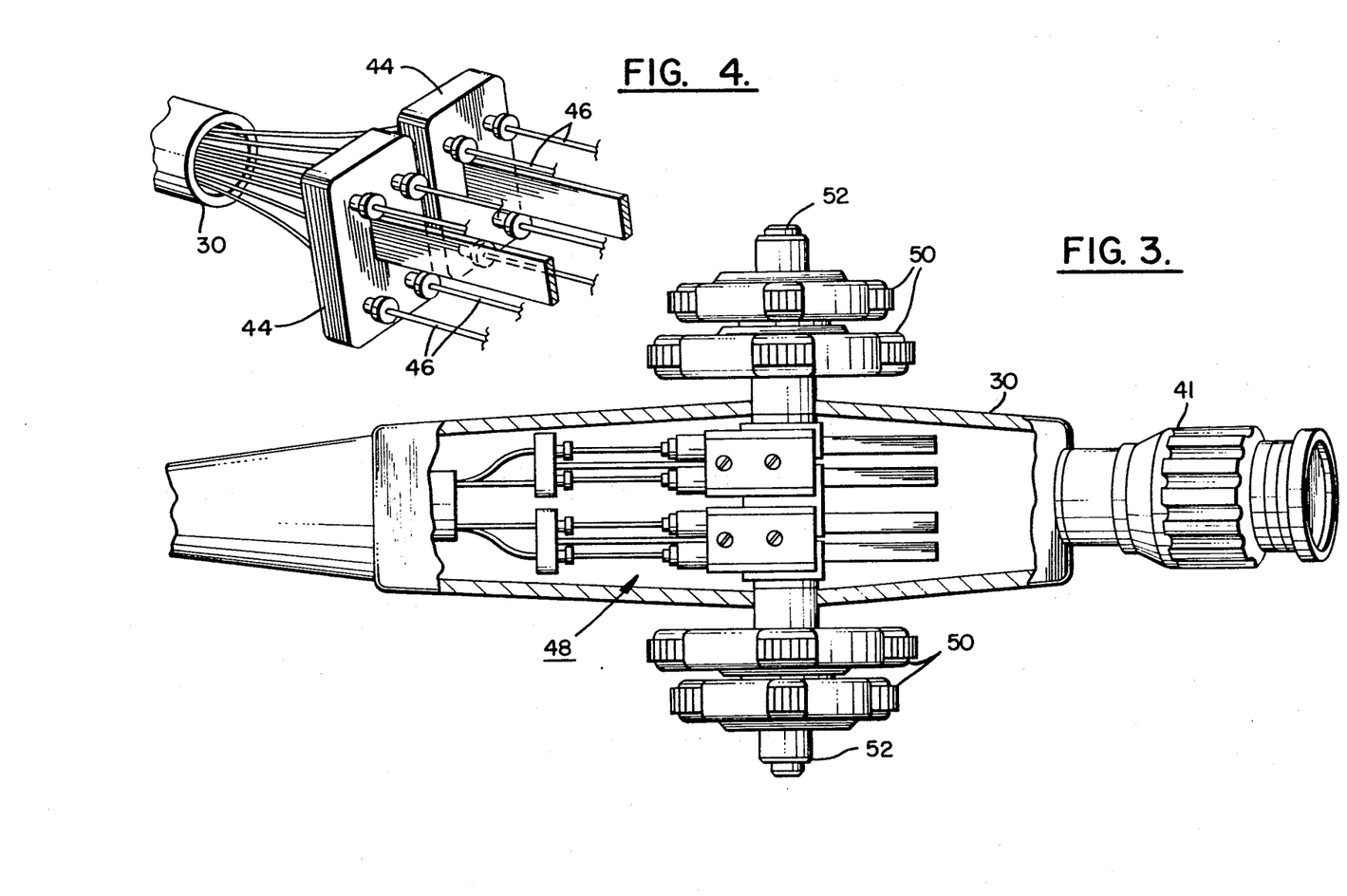
FIG. 3 is a plan view of the control segment of the instrument, the view being partially sectioned to show interior portions thereof.
FIG. 4 is a perspective view of a set of guide plates and control lines at the forward end of the control segment of FIG. 3.
Figure 10:
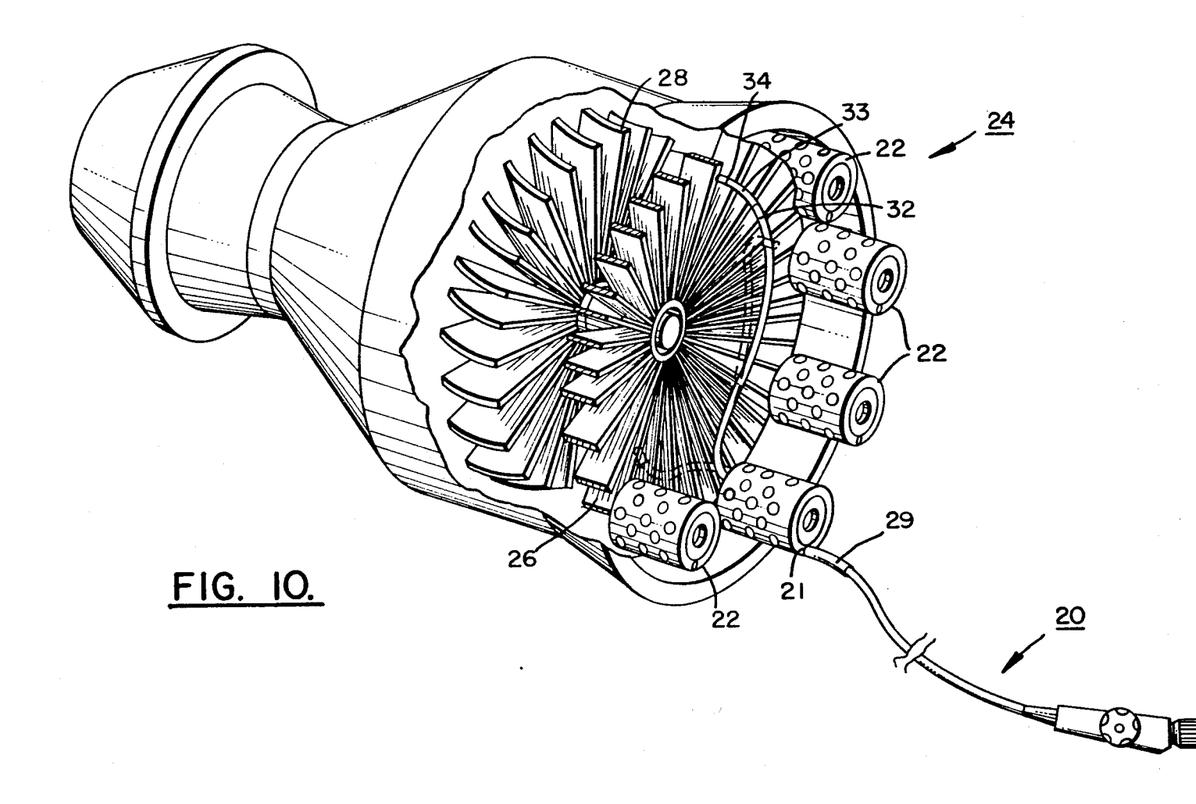
FIG. 10 is a further view of the jet engine of FIG. 1 demonstrating the emplacement of a tubular conduit for guiding the inspection instrument part of the way into the engine after which the climbing capability of the instrument is utilized for further guidance through the interstices of the engine.

An inspection instrument 20, as shown in FIGS. 1 and 2, is constructed with an elongated tubular form and incorporates the invention so as to permit passage of the objective segment thereof through the burner can 22 of a jet engine 24 and enter the region of the blades of the rotor 28 and stator 26 of the engine 24. In order to reach the blades, the instrument 20 is flexible enough to pass via a guide or tubular conduit 29 (shown also in FIG. 10) through a region within the burner can 22 which otherwise is able to provide little or no support by its interior surfaces to the instrument 20. FIGS. 1 and 10 show the instrument 20 inserted into the burner can 22 through guide 29 with the transitional segment 32 and deflector segment 33 beyond the guide in solid lines. The ability of the instrument to navigate within the engine is depicted by the several dotted line positions of these segments shown in these two figures. By manipulating the control cables through movement of the control knobs, the positions of the objective deflector and transitional segments are controlled by the operator to inspect several sites within the engine for defects and wear.

The end of the burner cans 22 have fuel nozzles 23 and at least a portion of burner cans 22 have an opening 21 for a spark plug, as shown in FIG. 1. The guide 29, when its use is desirable, can be inserted into the burner can through spark plug opening 21. The distal end of the instrument 20 is, in essence, supported or cantilevered by the guide 29 from a control head 30. A flexible segment 31 of the instrument 20 is supported within the guide 29 and is coupled at its proximal end to the control head 30.

Connecting with the distal end of the flexible section 31 is a transitional segment 32 followed by a deflector segment 33 and, at the distal end thereof, an objective segment 34. While the flexible section 31 is supported in the environment of a jet engine by the conduit 29, the transitional segment 32 and the deflector segment 33 are constructed with sufficient rigidity so as to be free standing. These segments are manipulatable since they are cantilevered from the guide 29.

Differences in stiffness between the transitional segment 32 and the deflector segment 33 as well as differences in obtainable lateral movement between these two segments provide for a climbing capability as will be subsequently described in further detail. By virtue of the climbing capability, the distal end of the instrument 20 is able to pass in unsupported fashion through spaces and around obstructions within the engine 24 to sites which are to be viewed by the objective segment 34.

Figure 7:
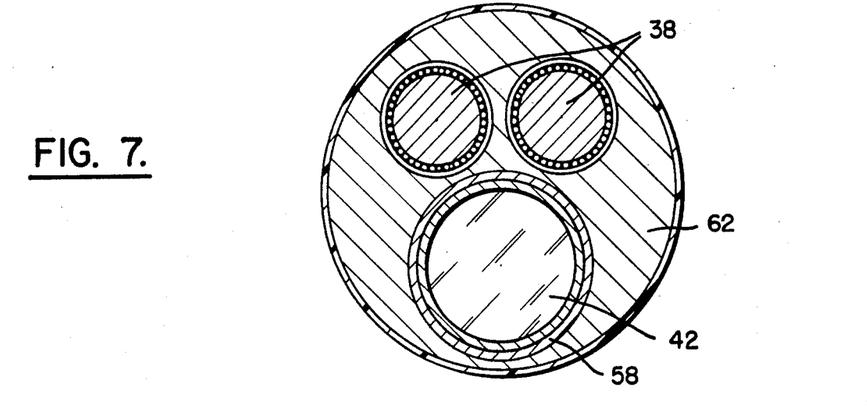
FIGS. 7, 8 and 9 are transverse sectional views taken along the lines 7—7, 8—8 and 9—9 in the drawings of FIGS. 5 and 6.

A conduit 36 has any suitable optical device for carrying light from a lamp box (not shown) for illuminating an inspection area within the engine 24. Conduit 36 is connected to the lamp box by lamp box connector 40. Light brought from the lamp box through conduit 36 is further brought to the objective segment 34 by fibers 38 shown in FIGS. 7, 8 and 9. Although two groups of fibers 38 are shown in this embodiment to assure sufficient illumination over the long distance to the site to be inspected, any suitable number of fiber groups can be used as required or desired by the instrument's application. Light reflected therefrom is conveyed back to the eyepiece 41 by any suitable optical system such as other ones of the fibers 58 also shown in FIGS. 7, 8 and 9. Alternatively, a small lamp can be placed in the objective segment adjacent the area being examined with suitable electrical connectors back to a source of power. An objective lens 42, shown in FIG. 7, is located in the segment 34 for viewing the subject matter. The structural details of the invention are better shown in FIGS.

3-9. In accordance with the invention, the instrument 20 incorporates a pair of plates 44 which guide control cables or wires 46 as they pass between the flexible section 31 and a capstan assembly 48. There are eight wires 46 in the embodiment shown, pairs of these wires being connected to respective ones of the knobs 50 through the shafts of the shaft assembly 52. A turning of a knob 50 simply winds or unwinds its respective pair of wires 46 about a corresponding capstan of the capstan assembly 48. Thereby, a back-and-forth rotation of any one of the knobs 50 introduces a nodding-type motion to the distal ends of the transitional and deflector segments 32 and 33, respectively. Each of the knobs 50 provides a flexing on one plane of the instrument 20 throughout the transitional segment 32 or a flexing of the instrument 20 throughout the deflector segment 33. Two knobs are assigned to control the flexing on the transitional and deflector segments, respectively. When the two knobs on one segment are used together, the segment can be articulated in all directions.

The transitional and deflector segments 32 and 33, respectively, incorporate transverse frame segments, ribs or elements which are to be referred to hereinafter as vertebrae 54 and 55, respectively. The vertebrae 54 maintain the shape of the transitional segment 32 and impart limited flexibility and sufficient rigidity thereto such that the segment 32 may be flexed through any desired arc. For instance, the transitional segment can be limited to flexing through an arc of approximately 60° for use in the jet engine application. Similarly, the vertebrae 55 maintains the shape of the deflector segments 33 and impart limited flexibility thereto to any desired arc. It has been found desirable to limit the flexing of the deflector segment 33 to an arc of approximately 180° in the jet engine application.

Two pairs of the wires 46 are anchored to a vertebra 54A at the distal end of the transitional segment 32 while the remaining two pairs of the wires 46 are anchored to a vertebra 55A at the distal end of the deflector segment 33. The two pairs of the wires 46 anchored to the distal end of the deflector segment 33 pass through the entire length of the transitional segment 32.

Figure 5:
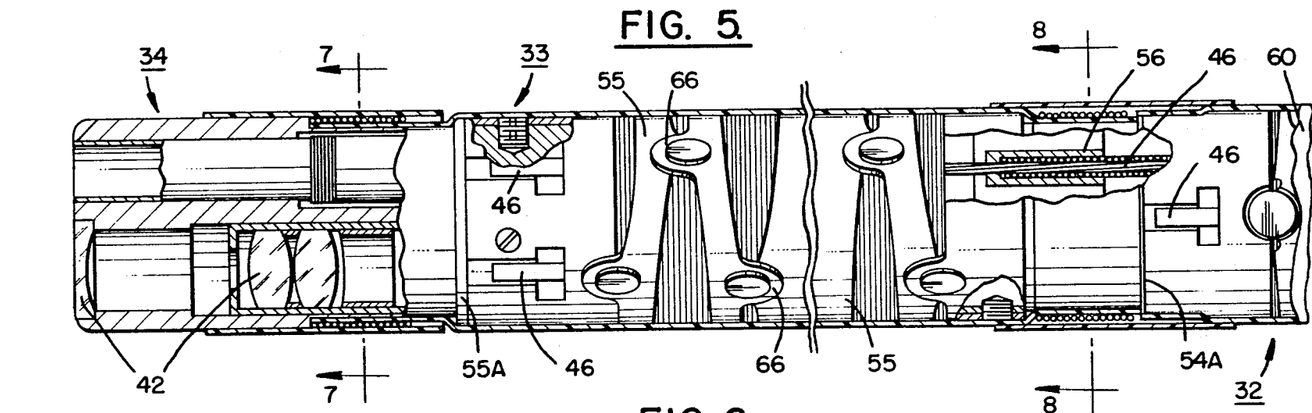
FIGS. 5 and 6, taken together, show a deflector segment and a transitional segment, respectively, of the inspection device of FIGS. 1 and 2 as well as portions of the instrument extending from the deflector and transitional segments, the views being sectioned and partially cut away to show interior portions of the instrument.
Figure 6:
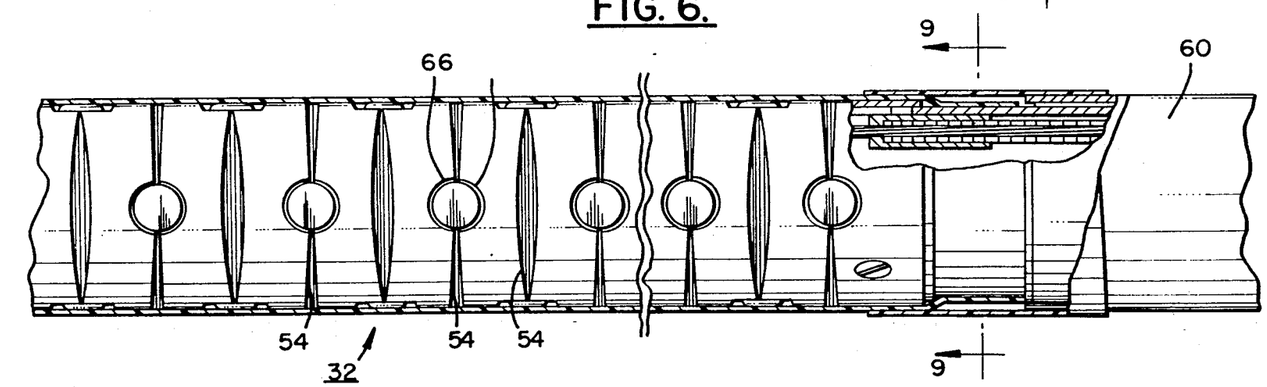

Only portions of the wires 46 are shown in FIGS. 5 and 6, the remaining portions of the wires 46 having been deleted to facilitate the description and explanation of the vertebrae 54 and 55. Only one of the anchoring points of a wire 46 to the vertebra 54A is shown in FIG. 5, the other three anchoring points being understood to be of the same construction. Also, only two of the anchoring points of the wires 46 to the vertebra 55A are shown in FIG. 5, the other two anchoring points being understood to be of the same construction. Thus, the sectional view of FIG. 9, near the proximal end of the transitional segment 32, shows a total of eight wires 46 while the transverse view of FIG. 8, near the proximal end of the deflector segment 33, shows only four wires 46.

The wires 46 can be carried within self-lubricating jackets 56 to permit facile translation of the wires 46 within the instrument 20. In addition to the elements described above, other conduits and elements can be incorporated into the instrument. For instance, a conduit for the delivery of liquids to the inspection site can be added. Such conduits are used in medical applications of the instrument 20 for washing the site as in the case of inspection of a cavity within the human body. Foreign body retrieving systems can also be included such as forceps. Any other suitable elements can be included in or on the instrument as the application would dictate or would be desired.

Figure 8:
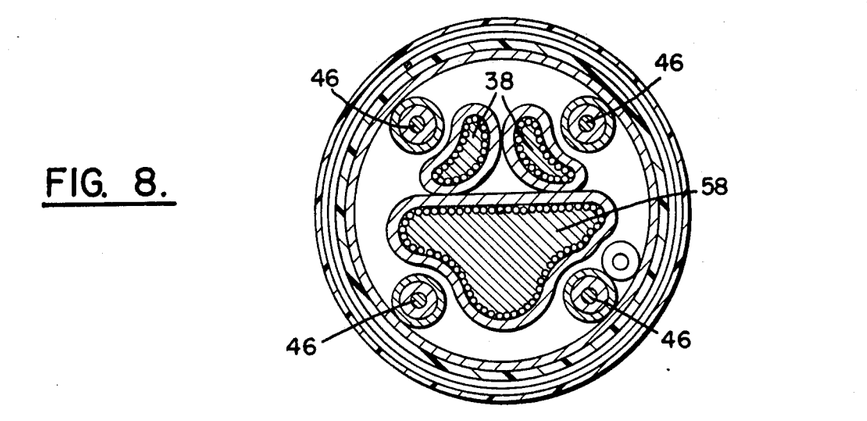
Figure 9:
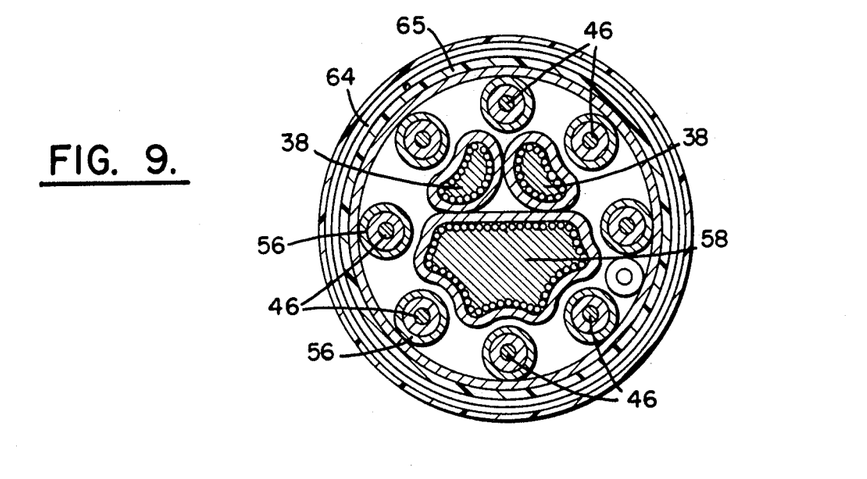

FIGS. 7-9 also show the distortion resulting from the inwardly directed forces of an outer sleeve 60 of the instrument 20 which presses the wires 46 against the bands of optical fibers 38 and 58. A transverse section of the objective segment 34, as depicted in FIG. 7, is free of such distention since none of the wires 46 are present in the objective segment 34. Alternatively, interior space within the sleeve 60 and between the bands of fibers 38 and 58 may be filled with any suitable filler material 62, such as with sponge rubber or a similar distensible material, to permit flexure of the instrument 20. The filler 62 also maintains the ends of fibers 38 and the conduit 58 in their respective positions within the sleeve 60. The outer sleeve can be fabricated of a metal braid at the flexible section 31. The flexible section 31 in this embodiment is provided with peripheral support by an outer flat coil spring 64 and an inner flat coil spring 65 (FIG. 9) which are arranged so as to spiral in opposite directions to provide some stiffness and tortional stability to the flexible section 31.

Figure 11:
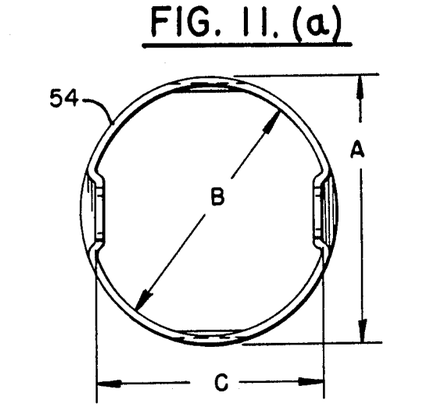
FIGS. 11(a)-(c) are views of the ribs used in the deflector segment.
Figure 12:
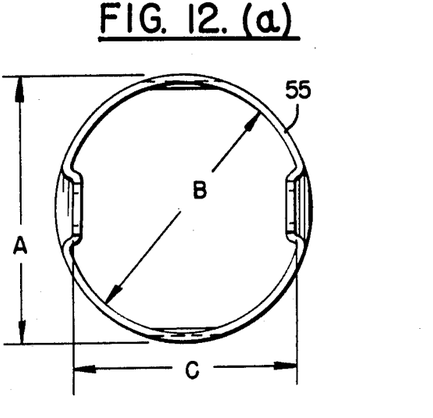
FIGS. 12(a)-(c) are views of the ribs used in the transitional segment.

The vertebrae 54 and 55 (FIGS. 5 and 6) are constructed in somewhat similar fashion. However, the vertebra 54 is wider than the vertebra 55 as measured along the axis of the instrument 20. The vertebra 54 also has smaller spacing therebetween than do the vertebra 55. The details of vertebra 54 are shown in FIGS. 11(a)-(c) while the details of vertebra 55 are shown in FIGS. 12(a)-(c). Each of the vertebra 54 and 55 is formed of a generally cylindrical or ring-like segment or element and has a pair of diammetrically opposed tabs 66 at both the distal and proximal ends of the cylindrical segment. Each of the tabs 66 are perforated to receive a pin 68 which serves as a pivot or hinge. The proximal tabs 66 of a vertebra 55 (best seen in FIG. 5) may be deflected inwardly so as to provide an overlapping relationship with the distal tab 66 of the adjacent vertebra. Thereby, the pin 68 passing through one of the overlapping tabs 66 also passes through the other of the overlapping tabs 66 to form a hinge means.

The arrangement of the vertebrae 55 of the deflector segment 33 shown in FIG. 5 is rotated 45° about the longitudinal axis of the instrument 20 relative to the arrangement of the vertebra 54 (FIG. 6) of the transitional segment 32 to provide clearance for the wires 46. As has been described earlier, four of the wires 46 are anchored to the vertebra 55A. As shown in FIG. 9, this set of four wires 46 is positioned in an arrangement that is rotated 45° relative to the arrangement of the wires 46 which are anchored to the vertebra 54A.

In each of the cylindrical segments of the vertebrae 54 and 55, the distal tabs 66 are rotated 90° about the cylindrical axis relative to proximal tabs 66. Thereby, pivoting is provided in orthogonal planes for flexure of the deflector segment 33 and in orthogonal planes for flexure for the transitional segment 32. The sleeve 60 is sufficiently stiff to maintain structural rigidity to both the deflector segment 33 and the transitional segment 32. Thus, these segments remain straight or in place until sufficient force is exerted by the wires 46 to overcome the stiffness forces. The stiffness of sleeve 60 is overcome when the control cables impart forces on the deflector segment 33 and the transitional segment 32 to flex or bend them as desired.

An important feature of the invention is the capability of the instrument to be able to be navigated and to climb over obstructions. This capability is implemented by a pulling on the wires 46. The portion of the sleeve 60 enveloping the transitional segment 32 is made stiffer than the corresponding portion enveloping the deflector segment 33. This is done to withstand the forces of the wires 46 which are anchored to the deflector vertebra 55A to flex the deflector segment 33 without flexing the transitional segment 32. The materials of the sleeve 60 can be any suitable material which function as described. For instance, sleeve 60 on the transitional segment 32 can be made of a relatively stiff plastic covering while the sleeve 60 on the deflector segment can be made of a flexible elastomer. Thereby, independent flexure of the segments 32 and 33 can be accomplished by manipulation of the requisite ones of the wires 46.

Further stiffening and limiting of flexure is provided by differences in the shapes of the vertebrae 54 and 55. The proximal and distal ends of the cylindrical segment of vertebrae 54 and vertebrae 55 are curved in the axial dimension to appear convex in the sectional view of FIGS. 5 and 6. The apex of the convex curve appears at the site of a tab 66, each of the tabs 66 being located at the apices of the convex edges of the vertebrae 54 and 55. Such an arrangement permits a rocking of one vertebra relative to the neighboring vertebra for flexure of the segments 32 and 33.

In addition, the convex shape of the edges provides for a varying spacing between neighboring vertebra, the spacing being smallest at the sites of the pins 68 and largest at points about 90° therefrom. By enlarging the axial length of the vertebrae and decreasing the spacing therebetween, the amount of flexure is reduced. By decreasing the axial length of the vertebrae and by enlarging the spacing therebetween, the amount of flexure is increased. Hence, by varying the amount of such length and such spacing, varying amounts of flexure are obtainable. Flexure is also affected by the stiffness of the material of sleeve 60.

In the preferred embodiment of the invention, a two-step variation in flexure is obtained by providing a reduced flexure to the transitional segment 32, and an enlarged flexure to the deflector segment 33. This embodiment is particularly useful in jet engine applications. A combination of differing stiffness to the outer sleeve 60 between the segments 32 and 33 as well as the differing configuration to their respective vertebrae 54 and 55, permits the independent control of their flexing. Through this means, a greater flexing ability is obtained with the deflector segment 33 than the transitional segment 32.

As an example of the construction of the vertebrae 54 and 55, reference is had to FIGS. 11(a)-(c) and FIGS. 12(a)-(c), respectively. The outside diameter "A" is approximately 0.423-0.427 inches while the inside diameter "B" is approximately 0.399-0.0402 inches. Dimension "C" is approximately 0.378 inches and Dimension "D" is approximately 0.377-0.379 inches. Dimension "H" is approximately 0.379-0.381 inches and Dimension "J" is approximately 0.144-0.148 inches.

Dimensions "E", "F", and "G", relating to vertebra 54 vary in the preferred embodiment of this invention to dimensions "E'", "F'" and "G'" relating to vertebra 55. Dimension "E" is approximately 0.126 inches while dimension "E'" is approximately 0.046 inches. Angle "G" is approximately 2.5° while angle "G'" is approximately 13°. Dimension "F" is approximately 0.010-0.013 while the dimension "F'" is approximately 0.045-0.052.

It is understood that all of the dimensions given above are merely examples of the relative dimensions of the individual vertebra and that any suitable set of dimensions can be used to have the sections deflect in the manner desired. Thus, this invention is not intended to be restricted in any way to the dimensions stated herein.

As mentioned beforehand, the transitional segment 32 is limited to a total flexing through an angle of approximately 60° while the deflector segment 33 is limited to a total flexing through an angle of aproximately 180°, in this embodiment. The increased flexure of the deflector segment 33 permits a directing of the objective segment 34 for viewing various parts of the engine 24 (FIGS. 1 and 10). The independent flexure and differing stiffnesses of the segments 32 and 33 provides the stair-climbing-like capability which is so advantageous for advancing the objective segment 34 over the blades of the rotor and stator of the engine 24.

The flexible segment 31 is relatively limp compared to the transitional and deflector segments. Although it does not have control cables to guide it in this embodiment, such cables could be added thereto if other applications made them desirable. Also, although it is desirable to use a tubular conduit or guide 29 to feed the instrument into the jet engine, the use of such a guide is unnecessary in other applications such as when the instrument is used as a medical device such as that used to examine the colon.

A description is now provided of a preferred method of use for the instrument in a jet engine application. The instrument 20, with its optical objective segment 34 leading, is fed into the guide 29 until its optical segment 34 reaches the rotor/stator area, such as in the 1st stage of the engine, or other area to be inspected. The burner cans in the six o'clock region of the jet engine where spark plug holes are (see FIG. 10), generally located are normally used to insert the instrument into the engine. The objective is then brought to the top of the jet engine by pushing the instrument 20 further into the engine and allowing the transitional segment to climb the wall of the stator or other convenient component of the engine. As the operator pushes the instrument further into the guide 29, he looks through the eyepiece 41 in the control body 30 and determines where the objective at the other end of the instrument is located relative to the top of the jet engine stator/rotor area. The manipulation of the deflector segment enables the operator to look all around the site of the objective segment. If the objective is being pushed in the wrong direction as he pushes the instrument further into the guide tube 29, he can make a mid-course correction by adjusting the position of the transition section through its control cables. In this way, all necessary mid-course corrections can be made so that the objective segment 34 is brought quickly and precisely to the top of the engine or other area thereof to be examined. Once at the top of the engine, the operator then can manually rotate the rotor to check each of the blades. After this is done, he then drops the instrument 20 or pulls the instrument 20 out of the guide tube, increment by increment, inspecting each of the stator blades as it passes down inside the engine.

On bringing the objective segment 34 up to the top of the engine, the transitional segment 32 keeps itself against the stator or other convenient nearby elements of the engine. Otherwise, the weight of the portion of the instrument beyond the guide 29 would cause that portion to fall out of control. The element relied upon, obviously, need not take the form of a conduit or take any other particular shape. The resistance against non-controlled deflection; that is, deflection not controlled by the knob means, of the transitional segment 32 enables this climbing-like procedure to take place. A purpose of the transitional segment configuration is to help the instrument climb up the wall of the engine and to keep that section of the instrument stiff so that the deflector segment 33 can be flexed and controlled relative to it.

With regard to the general dimensions of a device found suitable for jet engine inspection, the flexible segment 31 can be approximately 75–80 inches long, the transitional segment 31 can be approximately 7–9 inches long and the deflector segment 33 can be approximately 2–4 inches long. By way of comparison, an instrument was designed without the use of the transitional section 32 for the inspection of jet engines. When used in the manner described, the deflector and flexible segments alone did not work well to enable the instrument to climb up into the engine. The entire instrument collapsed inside the jet engine and the instrument could not be made to climb the wall and, thus, was not useful. The transitional segment 32 was then installed in the distal assembly having the vertebrae ribs as described herein in combination with the deflector and flexible segments, 33 and 31 respectively. The device with the transitional segment was made to climb up to the top of the engine and work in the manner desired.

A number of alternative embodiments of the instrument are possible depending upon the application in which it is to be used. The type of instrument described herein can be used in all types of inspection environments wherein components are not readily visible to the human eye. For instance, it can be used in the medical area, steam turbines, refinery equipment such as those using pipelines and tubes, brewery equipment, pressure vessel apparatus such as those for cryogenic and heating purposes, tank trucks, etc. The instrument provides navigational capabilities as well as inspection capabilities.

It is to be understood that the above described embodiment of the invention is illustrative only, and the modification thereof may occur to those skilled in the art. Accordingly, this invention is not to be regarded as limited to the embodiment disclosed herein.

What is claimed is:

1. In an inspection instrument of a generally tubular flexible shape having a control head at a proximal end thereof and an objective assembly at the distal end thereof for viewing subject matter to be inspected, the improvement comprising:
    a transitional segment and a deflector segment coupled thereto, said transitional segment and said deflector segment being disposed between said control head and said objective assembly;
    control lines threading said transitional segment, said deflector segment, and terminating in said control head;
    first means within said transitional segment for restraining flexure thereof;
    second means within said deflector segment for restraining flexure thereof, said first restraining means restraining the flexure to a greater extent than the restraining of said second restraining means thereby allowing said deflector segment to have increased lateral movement relative to said transitional segment, a portion of said control lines terminating in said transitional segment with the balance of said control lines terminating in said deflector segment, forces for actuating individual ones of said control lines being provided by said control head; and wherein said transitional segment includes stiffening means to permit actuation of the portion of said control lines which control flexure of said deflector segment to the operator independently of the remaining portion of said control lines for independent flexure of said transitional segment and said deflector segment to provide a climbing-like ability to said inspection instrument to enable the instrument to pass through regions of a complex structure.

2. An instrument according to claim 1 further comprising a flexible section coupling said transitional segment to said control head, and an external tubular guide removably positionable about said flexible section for directing said instrument part way to an inspection site.

3. An instrument as set forth in claim 1 wherein said first flexure restraining means comprises an articulated frame having a circumferential sheath, said frame including individual members which are configured for engagement with each other upon a predetermined amount of bending at a point of articulation.

4. An instrument as set forth in claim 3 wherein each of said framed members are ring-shaped to permit passage of said control lines through a central portion of said frame, each of said points of articulation including a pair of diametrically opposed hinges extending from one of said frame members.

5. An instrument as set forth in claim 4 wherein alternate ones of said diametrically opposed pairs of hinges are oriented by rotation of 90° about a central axis of said frame relative to a neighboring pair of said diametrically opposed hinges to provide for articulation in orthogonal directions.

6. An instrument as set forth in claim 5 wherein said second flexure restraining means includes an articulating frame having members which are hinged to each other and being formed with a shape to provide engagement between adjacent ones of said members upon reaching a predetermined amount of flexure, said first restraining means being closer to said control head and second restraining means being closer to said objective assembly, and wherein the configuration of the members of the frame of said first restraining means limits flexure to a greater extent than does the members of the frame of said second restraining means so as to provide said climbing capability.

7. An instrument according to claim 6 wherein said control lines includes a set of wires coupled to said control head, a portion of said wires being anchored to a member of a distal end of said frame of said first restraining means while the ends of remaining ones of said wires are anchored to a frame member at the distal end of said frame of said second restraining means to provide for independent flexure of a frame member of said first restraining means relative to the frame member of said second restraining means.

8. An inspection instrument of a generally tubular flexible shape having a control head at a proximal end thereof and an objective assembly at a distal end thereof for viewing a site to be inspected and having the ability to pass through regions of a complex structure to view said site comprising:
    a first flexible segment and a second flexible segment, said first and said second flexible segments being coupled in seriatum and disposed between said control head and said objective assembly; and means coupled to said control head for flexing said first segment and said second segment independently of each other said first and second segments having differences in stiffness and obtainable lateral movement to provide for a climbing capability allowing said distal end of said instrument to pass unsupported to said site.

9. An instrument as set forth in claim 8 wherein said second flexible segment has increased lateral movement relative to said first flexible segment and said first flexible segment has increased stiffness relative to said second flexible segment thereby imparting a two-step variation in flexure to said instrument.

10. An inspection instrument having a tubular flexible shape and a control head at a proximal end thereof and an objective assembly at a distal end thereof for viewing a site to be inspected comprising:

a transitional segment;

a deflector segment;

said transitional segment and said deflector segment being coupled in seriatum between said control head and said objective assembly;

each of said segments comprising a set of hinged ring-shaped framing members and a flexible sheath enclosing said framing members; and the stiffness of said sheath and the shapes of said framing members in said transitional segment providing a resistance to flexure of said transitional segment, the stiffness of the sheath and the shapes of the framing members of said deflector segment providing a resistance to flexure of said deflector segment, the resistance to flexure of said transitional segment being greater than the resistance to flexure of said deflector segment to provide a climbing action to said instrument and to thereby enable said instrument to pass through regions of a complex structure.

* * * * *